Dec. 18, 1934.                A. W. SCHWEIBOLD                1,984,947
CONTROL DEVICE FOR AUTOMOTIVE GENERATORS
Filed July 28, 1931
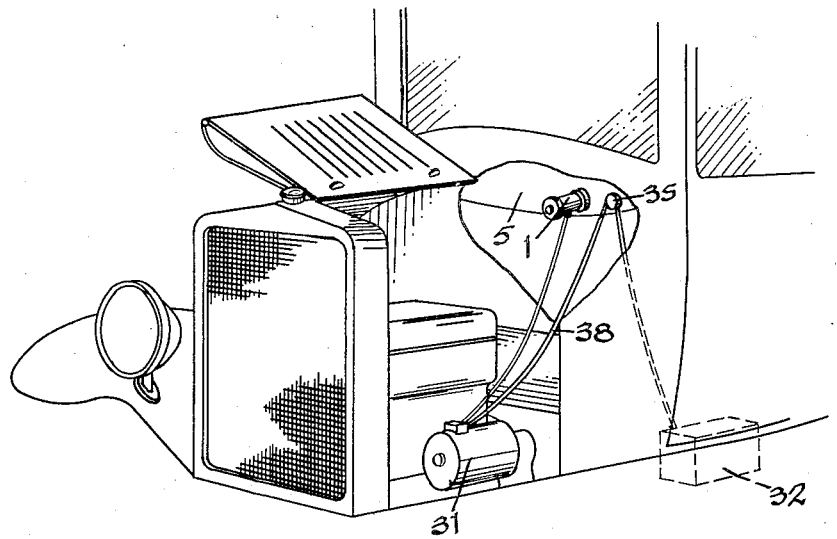
Fig 1
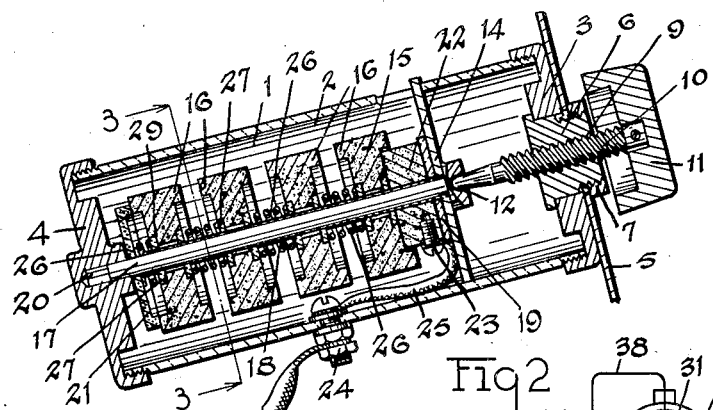
Fig 2
Fig 4
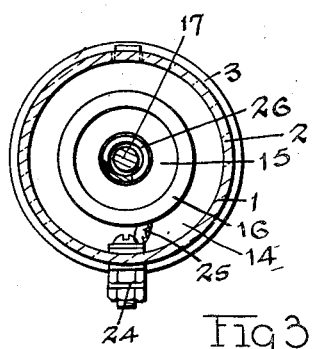
Fig 3
Inventor
Alvin W. Schweibold
By Faust & Crampton
Attorney Patented Dec. 18, 1934

1,984,947

UNITED STATES PATENT OFFICE 1,984,947

CONTROL DEVICE FOR AUTOMOTIVE GENERATORS

Alvin W. Schweibold, Monroe, Mich.

Application July 28, 1931, Serial No. 553,607

2 Claims. (Cl. 201—51)

My invention has for its object to provide a convenient and efficient control device for generators whereby the electrical current produced by the generator may be regulated. The invention also provides a series of inter-related elements which may be moved in relation to each other so that current produced by the generator may be reduced to prevent over-charging of the battery. The invention also provides a means for manually operating the control device to vary the amperage of electric energy conveyed to the battery to maintain a suitable charged condition of the battery for later consumption. The invention particularly provides a control device which may be conveniently located to the operator's hand in the circuit of an automobile, motorboat or airplane electric system so that the electric energy produced by the generator may be controlled while operating the vehicle during trips of varying lengths to maintain a desirable charge in the battery.

The invention may be used for various purposes and may be contained in various details of construction, and, to illustrate a practical application of my invention, I have selected one form of control device, as an example of such devices, and shall describe it hereinafter. The device, selected for purposes of illustration, is shown in the accompanying drawing.

Fig. 1 is a perspective view of a front portion of a car, a portion thereof being broken away to show the control device on the interior of the car. Fig. 2 is a longitudinal cross section of the control device. Fig. 3 is a view of a section taken on the plane of the line 3—3 as indicated in Fig. 2. Fig. 4 is a diagrammatic view of the electric system.

As is well known, electrical energy produced by a generator, and particularly a generator of the type used in connection with automobile electric systems, in which the generator is operated by the crank shaft of the automobile, is often stored in suitable batteries during the operation of the crank shaft of the motor. The demands for energy placed upon the batteries often vary with the seasons of the year and also the use which is made of the automobile. Generators heretofore in use have been adjusted and controlled by adjusting a control brush or third brush in a position relative to the armature so as to vary the flow of energy through the field winding, thereby creating more or less magnetic flux through which the armature rotates. During the operation of the automobile on a trip of great distance the energy produced by the generator will be increased and tend to over-charge the battery and reduce its future utility. During the colder seasons of the year, the use of an automobile usually diminishes the electrical power stored in the battery through the use of the lamps and the starting of cold motors. During the warmer months of the year, unless the current produced by the generator is varied, the battery may be over-charged, such as when the motor is operated for a period of time at a high rate of speed. Consequently, in order to insure efficient operation of the battery the control brush of the generator must be reset in accordance with the varying demands on the battery. This necessitates the attendance of a skilled mechanic and results in an increased cost in the use of the vehicle. By the use of my invention, the productive capacity of the generator may be controlled by increasing or decreasing a resistance to the flow of electrical energy through the field windings of the generator to vary the number of lines of magnetic flux cut by the armature windings of the generator and thereby making it possible to maintain a suitably charged battery for all purposes by the operator of the car. The control brush is set so as to permit the maximum flow of current through the field windings. The brush is connected to the control device of my invention which may be operated to vary the flow of current through the field windings from maximum to substantially no current.

In the form of construction shown in the drawing, the operating portions of the control device may be located in a suitable container 1. The container 1 has a shell portion 2 and threaded caps 3 and 4 for closing the ends of the container. The shell 2 of the container may be formed of sheet metal and supported in the part of the automobile for convenient manipulation of the control device by the operator of the automobile, as on the instrument panel, by the cap 3 which may be provided with a threaded stem member 6 and a nut 7. The nut 7 is threaded onto the stem member 6 to locate the surface of the cap 3 against the instrument panel 5. The stem member 6 has a central opening 9 which may be threaded for receiving a screw 10. To rotate the screw 10, a handle 11 may be connected to the outer end of the screw and may be operated by a user for controlling the movement of a plate 14 connected to the control device.

The inner end of the screw 10 is preferably tapered to form a round head which may be located in a socket 12 centrally located in the plate 14. The plate 14 is substantially the same diameter as the diameter of the inner surface of the shell 2 and is limited in its movement within the shell. Thus, as the handle 11 is manipulated to rotate the screw 10, the plate 14 will be moved along the wall of the shell 2 to move the resistance elements 15 for regulating the flow of current to the generator poles.

The resistance members 15 may be formed of a resistant material, such as carbon or graphite. The characteristics of these, and like materials, are such as to present a resistance to the flow of electrical energy through them without destructive overheating of the materials. The members 15 may be circular in form and provided with protruding rim portions 16. The members 15 are slidably supported on a shaft 17, being insulated from the shaft by a tube of insulating material 18. The shaft 17 is connected to the plate 14 and slidably supported in a socket 20 formed in the end of the cap 4 of the shell 2. A block 22 of carbon or other electro-conductive material, is preferably located on the shaft 17 so as to make contact with one of the members 15. The block 22 is separated from the plate 14 by an insulation washer 19 and may be provided with a binding post 23 which is connected to a terminal connection 24 by a wire 25 to connect the block 22 with the circuit of the field windings of the generator. Thus, the ground circuit through the members 15 may be completed by a carbon washer 21 which is located so as to make contact with the cap 4 of the shell and one of the members 15. As the handle 11 is manipulated to rotate the screw 10 in one direction, the plate 14 will be moved to move the members 15 toward each other, to increase the contact area or increase the contact pressure between the rim portion 16 of the adjoining members 15 and thereby reducing the resistance to the current through the rim portions 16 of the members 15 and to the terminal 24.

To increase the resistance of the circuit any suitable means may be provided to reduce the contact area or the contact pressure. In the preferred form illustrated in the drawing, the members 15 are separated from each other by springs 26. The springs 26 are located about the shaft 17 and the ends of the springs rest against insulating washers 27. The washers 27 may be located in the recesses 29 formed in the ends of the members 15. Thus, when the operator desires to increase the flow of electrical current through the field windings to cause greater excitation of the field, the screw 10 may be rotated to move the members 15 toward each other and against the pressure of the springs 26. In order to decrease the flow of electrical current through the field windings of the generator, the screw 10 is rotated in the reverse direction to release the pressure of the springs 26. The pressure of the springs 26 will be exerted against the washers 27 to release the pressure between the rim portions 16 of the members 15.

In order to control the flow of electrical current received by the battery from the generator, the members 15 are connected to the field windings 30 of the generator 31. As the members 15 are pressed together the flow of electrical current through the field windings 30 will be increased, increasing thereby the magnetic flux of the field through which the armature 33 of the generator passes. There will be a corresponding increase of the induced current within the armature 33, which current is conveyed to the battery 32 by brushes 36 and lines 38. Thus, the electric energy induced in the armature 33 and received by the battery 32 will be regulated according to the resistance created in the line of the field windings 30. The increase or decrease of generator output may be recorded by an indicator, such as by the ammeter 35, which may be located in line 38. The ammeter may be observed by an operator to obtain the desired excitation of the field windings, and consequently the amperage of the electrical energy being received by the battery.

Thus, the invention provides a control device of simple construction which may be manufactured and installed in the circuit of an automobile or similar vehicle, at relatively low cost.

I claim:

1. In a generator control adapted to be connected in series with the field coil of the generator, a tubular housing having threaded end portions, a pair of end closure caps threadably connected to the housing, one of said pair of caps having a boss portion, a recess formed in said boss portion, an insulated shaft, one end of the insulated shaft disposed within the said recess and adapted to be reciprocated therein, a plate extending transverse the housing and being reciprocable for a limited distance within the housing, the other end of said shaft connected to the plate, a hand operable screw threadably mounted in the other of said pair of caps, the screw adapted to engage the said plate whereby the plate may be moved toward the first named end cap, a plurality of discular resistance members, each of said plurality of discular resistance members having surfaces adapted to contact with like surfaces on the neighboring discular resistance members, means for connecting the discs in circuit with the field coil of a generator, the plurality of discular resistance members slidably mounted on the shaft intermediate the plate and the first named end cap whereby upon movement of the plate toward the first named end cap the discular resistance members will be moved toward each other to decrease the resistance to the passage of an electrical current therethrough and resilient means for effecting separation of the discular resistance members when the plate is moved toward the second named end cap to increase the resistance to the passage of an electrical current therethrough whereby the resistance in the circuit of the generator field coil may be varied according to the operation of the hand operable screw.

2. In a vehicle generator control adapted to be connected in series with the field coil of the generator, a housing having open ends and adapted to be mounted on the vehicle at a point of ready accessibility to the vehicle operator, a pair of end closure caps, each end closure cap connected to one of the open ends of the housing, one of the said end closure caps having a boss portion, a recess formed in the boss portion, an insulated shaft, one end of the insulated shaft adapted to be slidably received in the recess and reciprocable with respect thereto, a member extending transverse the interior of the housing and disposed for limited reciprocation through the interior of the housing, the other end of the shaft connected to the said member, a hand operable screw threadably mounted in the second of said pair of end closure caps, the screw having a headed end portion adapted to engage the said member, a plurality of resistance members slidably mounted on the shaft in axial alignment with each other and intermediate the first end closure cap and the said member, means for connecting one of the said plurality of resistance elements with the field coil of the vehicle generator, means for grounding another of the said plurality of resistance elements whereby upon movement of the member toward the first of said end closure caps, a current of a certain value will flow through the resistance elements and the generator field coil, and resilient means supported concentric with the shaft for effecting separation of the resistant elements when the member is moved away from the first of said end closure caps to decrease the said certain value of current flowing through the resistance elements and the generator field coil whereby the vehicle operator may vary the current in the vehicle generator field coil by operation of the said hand operable screw.

ALVIN W. SCHWEIBOLD.